United States Patent [19]

Lebby et al.

[11] Patent Number: 5,265,184
[45] Date of Patent: Nov. 23, 1993

[54] MOLDED WAVEGUIDE AND METHOD FOR MAKING SAME

[75] Inventors: Michael S. Lebby; Shun-Meen Kuo, both of Chandler; Davis H. Hartman, Phoenix; Christopher K. Y. Chun, Mesa, all of Ariz.

[73] Assignee: Motorola, Inc., Schaumburg, Ill.

[21] Appl. No.: 889,335

[22] Filed: May 28, 1992

[51] Int. Cl.$^5$ .............................................. G02B 6/10
[52] U.S. Cl. .................................... 385/132; 385/143; 385/145; 264/1.5
[58] Field of Search ................ 385/129, 130, 131, 132, 385/143, 145; 264/1.5

[56] References Cited

U.S. PATENT DOCUMENTS

| | | |
|---|---|---|
| 3,719,462 | 3/1973 | Andreatch, Jr. et al. ........... 385/129 |
| 4,480,184 | 10/1984 | Ely ................................. 250/227.22 |
| 4,609,252 | 9/1986 | Wong et al. ......................... 385/130 |
| 5,061,029 | 10/1991 | Ishikawa ............................ 385/132 |
| 5,136,678 | 8/1992 | Yoshimura ......................... 385/132 |
| 5,175,790 | 12/1992 | Groh et al. ........................ 385/143 |

OTHER PUBLICATIONS

Blyler et al., Proc. of the 41st Electronics Components, and Technology Conference, "A Molded Polymeric Resin-Filled Coupler", May 3, 1991, Atlanta, Georgia, USA, pp. 38-43.

*Primary Examiner*—Frank Gonzalez
*Attorney, Agent, or Firm*—Eugene A. Parsons

[57] ABSTRACT

A method for manufacturing a molded waveguide (50) is provided. A first cladding layer (20) is provided. Channels (21) are formed in the first cladding layer (20). A second cladding layer (40) is subsequently provided. The channels (21) in the first cladding layer (20) are then filled with an optically transparent polymer. The second cladding layer (40) is subsequently affixed over the channels (21) of the first cladding layer (20), thereby enclosing the channels (21).

30 Claims, 3 Drawing Sheets

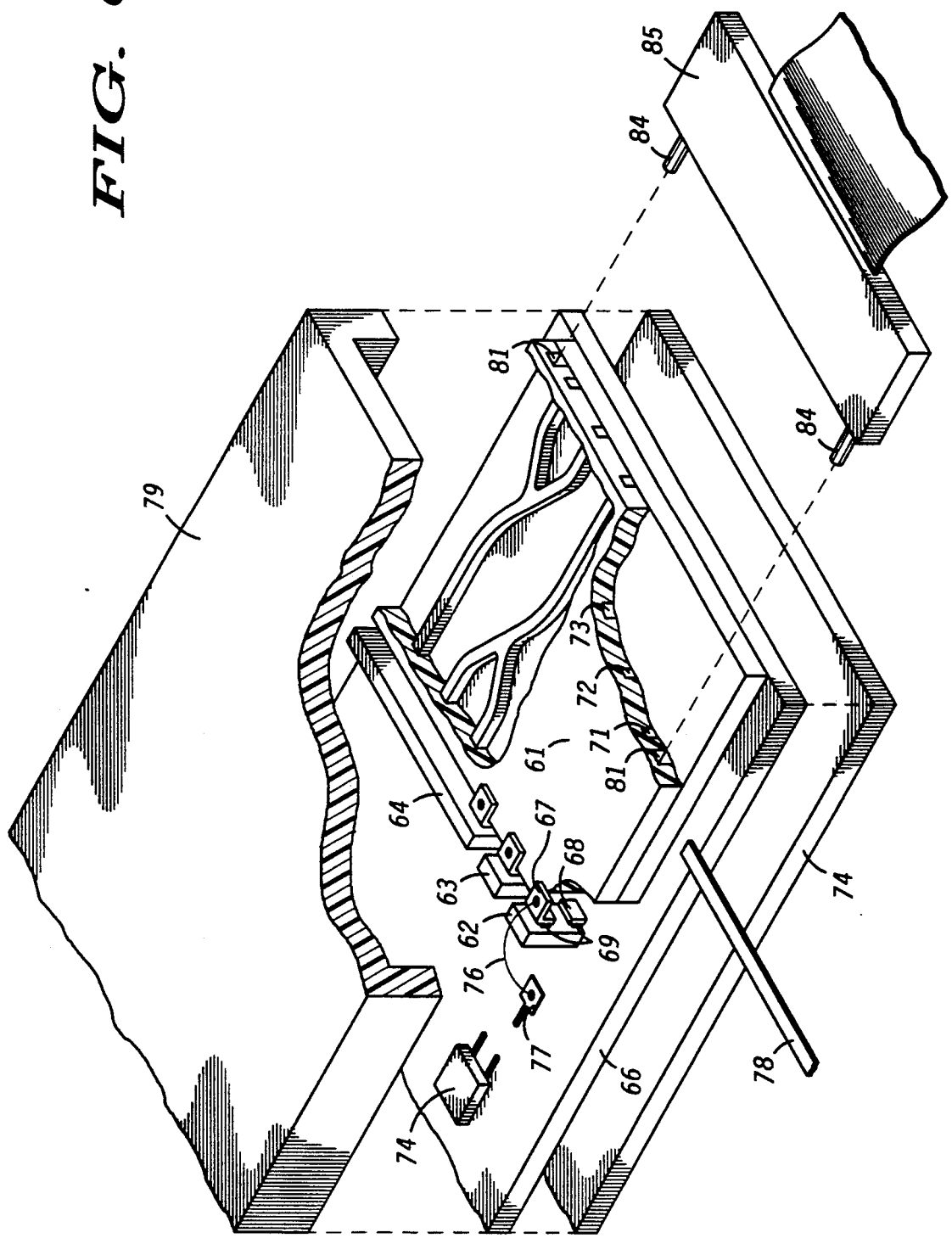

MOLDED WAVEGUIDE AND METHOD FOR MAKING SAME

BACKGROUND OF THE INVENTION

This invention relates, in general, to waveguides and, more particularly, to fabrication of molded waveguides.

At the present time, fabrication of optical waveguides is achieved by either a polymer spin-on technique or a diffusion technique, both of which require expensive photolithography steps. Additionally, both fabrication techniques are ineffective and inefficient for fabricating optical waveguides in high volumes for several reasons, such as complex processing steps, difficulties in controlling the processing steps, and high cost.

Briefly, as practiced by one method in the prior art, a polymeric film is spun onto a substrate. Portions of the polymeric film are subsequently exposed to light by a photolithographic process, thereby changing the refractive index of the polymeric film and creating a waveguide in the polymeric film. However, subsequent multi-step processing, such as removal of the polymeric film from the substrate, lamination processing, curing, and other processes typically are required for the waveguide to be useful. Further, it should be noted that each additional processing step incurs an additional cost, as well as presenting an opportunity to induce defects into the waveguide.

Alternatively, in another method practiced in the prior art, a layer such as a glass is applied to a substrate. The layer is patterned by a complicated photolithography process, thereby producing portions that are masked and portions that are open or clear. Typically, ions are subsequently diffused into the open portions of the layer, thus changing the refractive index of the layer and making a waveguide. However, by using a photolithography process, a high cost is incurred into manufacturing of the waveguide. Also, by using diffusion processes to change the refractive index of the layer, control of dimensionality of the waveguide is severely limited.

Additionally, while making grooves in a plastic material and subsequently filling of these grooves with material for conducting light has been done in the past, these methods are only adequate for large mechanical orientated optical systems. Further, these methods characteristically are inefficient at conducting light, thus making them unsuitable for use in high speed communications.

It can be readily seen that conventional methods for making waveguides have severe limitations. Also, it is evident that the conventional processing uses a multitude of steps which are not only complex and expensive, but also not effective processing. Therefore, a method for making a waveguide that provides a reduction in the number of steps required, reduces cost, and simplifies the processes necessary for making a waveguide would be highly desirable.

SUMMARY OF THE INVENTION

Briefly stated, a method for manufacturing a molded waveguide is provided. A first cladding layer is provided. Channels are formed in the first cladding layer. A second cladding layer is subsequently provided. The channels in the first cladding layer are then filled with an optically transparent polymer. The second cladding layer is subsequently affixed over the channels of the first cladding layer, thereby enclosing the channels.

BRIEF DESCRIPTION OF THE DRAWINGS

FIG. 6 is a partially exploded simplified pictorial view of an optical electronic module.

DETAILED DESCRIPTION OF THE DRAWINGS

Figure 1:
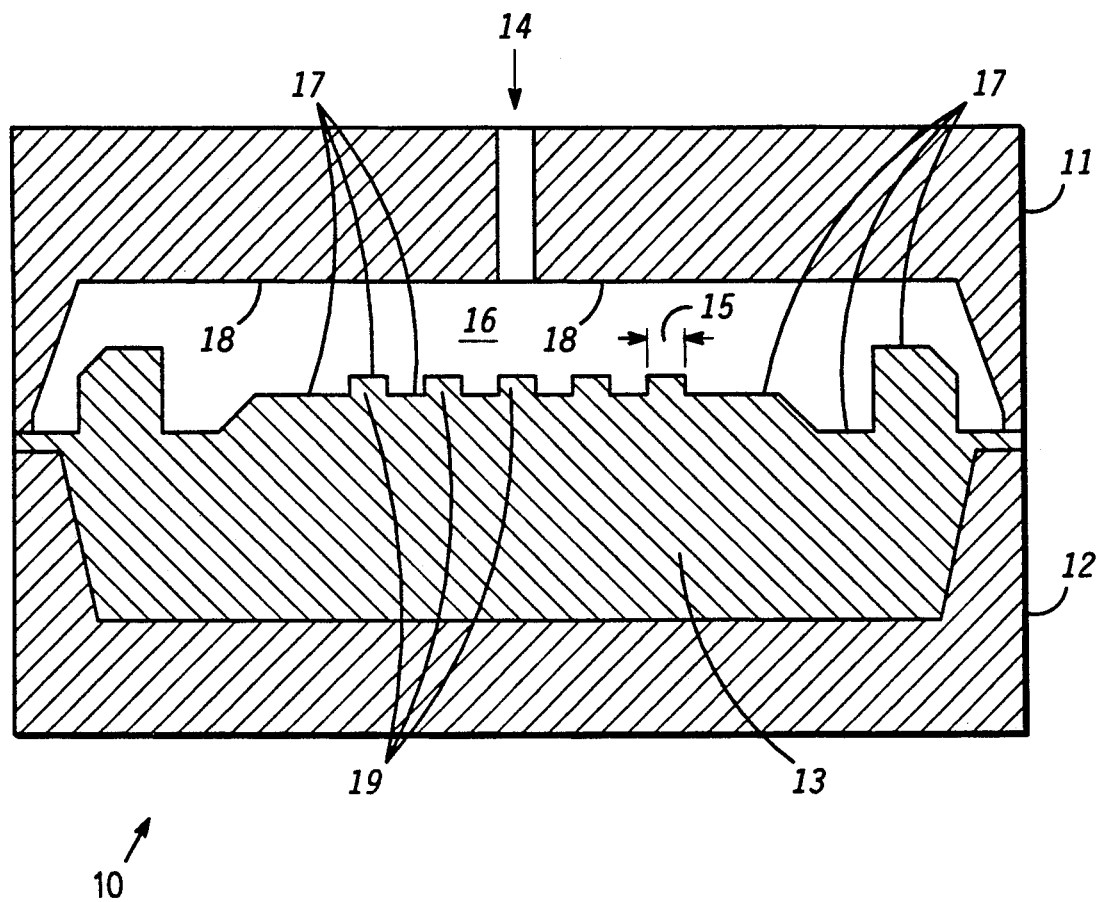
FIG. 1 is a simplified cross-sectional view of a mold.
Figure 2:
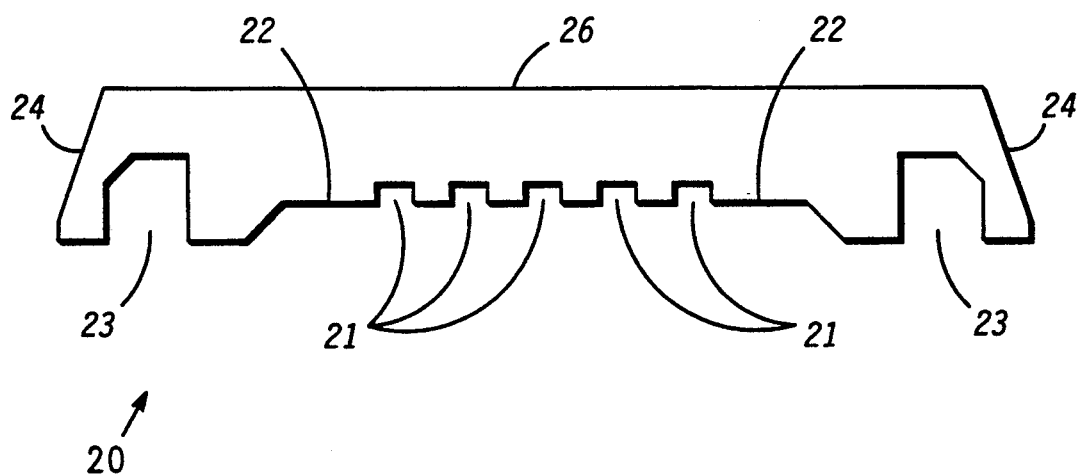
FIG. 2 is a simplified cross-sectional view of a molded first cladding layer.

FIG. 1 is a simplified cross-sectional view of a mold 10 used for making a first cladding layer 20 shown in FIG. 2. It should be understood that mold 10 has been greatly simplified and that only a brief description of mold 10 is necessary for a clear understanding of the present invention. Typically, mold 10 is made of a top portion 11 and a bottom portion 12. Commonly, these top and bottom portions, 11 and 12, are made of a metal materials, such as stainless steel, aluminum, or the like. Further, these top and bottom portions 11 and 12 typically are configured so as to provide appropriate heating and cooling capabilities, as well as providing necessary pressure capabilities that are dictated by the selection of the molding materials or molding compounds. Template 13 typically is made of similar materials as are top and bottom portions 11 and 12. However, it should be understood that while template 13 is advantageous for manufacturing small volumes of a molded product, template 13 would be incorporated into bottom portion 12 for use in manufacturing high volumes of a molded product.

Generally, with template 13 placed in bottom portion 12, with top portion 11 and bottom portion 12 securely held together, with the appropriate process conditions selected for the specific molding compound or molding material, the molding material is injected into cavity 16, represented by arrow 14. Features 19 of template 13 are made in a variety of cross-sectional shapes and sizes, such as V-grooves, semicircles, U-grooves, rectangular grooves, with a minimum feature size of 0.5 micron or the like. Further, it should be understood that features 19 extend longitudinally into the paper and that many different geometric patterns are capable of being fabricated with features 19, such as bending or curving of features 19, joining or splitting of features 19, or the like as illustrated in FIG. 6. Also, width 15 of features 19 is capable of being adjusted to meet specific design requirements, such as optical mode mixing, optical mode matching, or adiabatic tapering. However, in a preferred embodiment of the present invention, a rectangular groove that is 50.0 microns by 50.0 microns on each side is used.

Typically, the molding compound is made of an optically transparent material, such as epoxies, plastics, polyimides, or the like. Generally, refractive indexes of these optically transparent materials range from 1.50 to 1.54. In a preferred embodiment of the present invention, optically transparent epoxies are used as the molding material. Processing conditions for these materials range from 22 degrees Celsius to 200 degrees Celsius for molding temperatures and 200 pounds per square inch to 2,000 pounds per square inch for molding pressures. By injecting the molding material, represented by arrow 14, into cavity 16, intricacies of surface 17 of template 13 and intricacies of surface 18 of upper portion 11 are transferred to the molding compound. A subsequent curing process solidifies the molding compound, thereby permanently transferring the intricacies or a negative image of surfaces 17 and 18 to the solidified molding compound in cavity 16.

Once the curing processes are completed, mold 10 is opened and a molded first cladding layer 20, as shown in FIG. 2, is removed from mold 10.

FIG. 2 is a simplified cross-sectional view of the molded first cladding layer 20 formed as described with reference to FIG. 1. Typically, channels 21 are made as rectangular grooves; however, other geometric configurations may be made, such as U-grooves, semicircles, V-grooves, or the like. In addition, channels 21 and 22 are made in such a manner so as to produce smooth defect free surfaces. Surfaces 24 and surface 26 may also be smooth and defect free; however, these surfaces may also be shaped according to specific application. For example, surface 26 may be modeled to provide a greater surface area. Also, it should be understood by one skilled in the art that by molding channels 21 a smooth defect free surface is achieved at a minimal cost. Typically, surface 22 of first cladding layer 20 is recessed into first cladding layer 20, thereby allowing a subsequent adhesive to be spread into channels 21 and across surface 22 without significantly entering openings 23.

Figure 3:
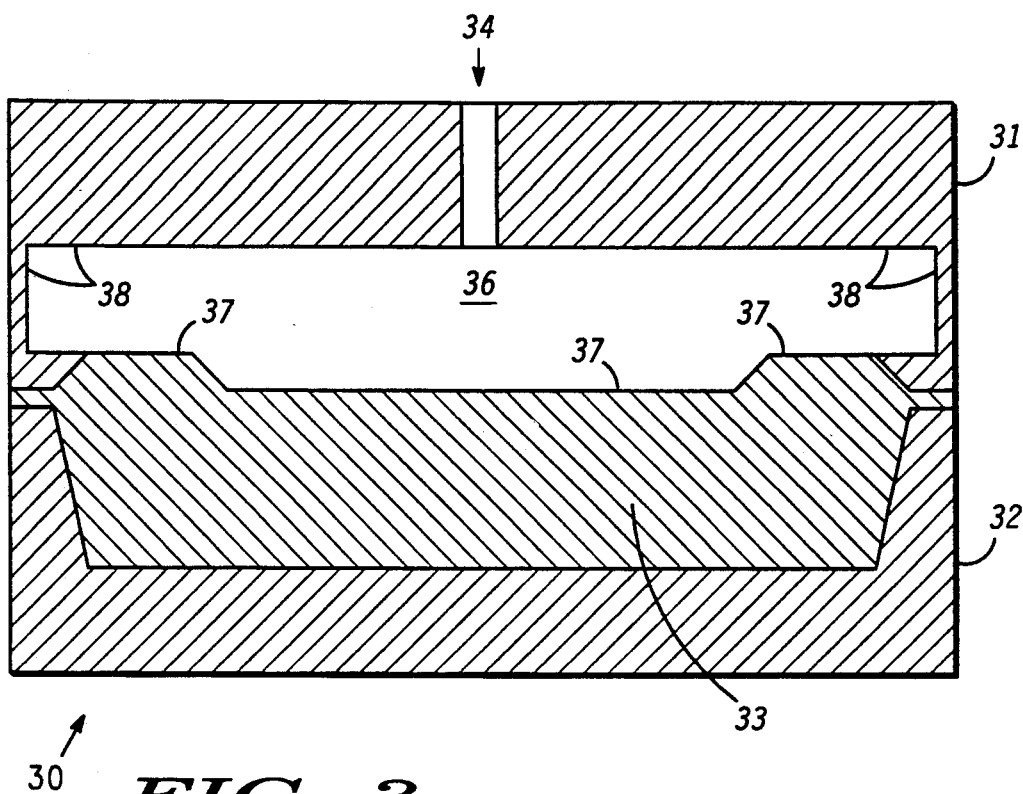
FIG. 3 is a simplified cross-sectional view of another mold.
Figure 4:
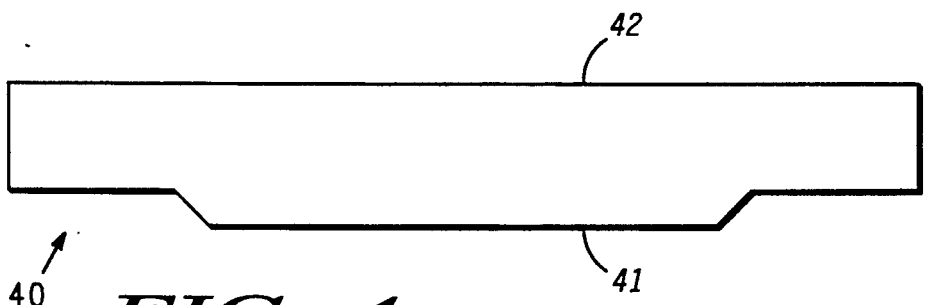
FIG. 4 is a simplified cross-sectional view of a molded second cladding layer.

FIG. 3 is a simplified illustration of a cross-sectional view of a mold 30 used for making a second cladding layer 40 as shown in FIG. 4. Typically, mold 30 is made of an upper portion 31, a lower portion 32, and a template 33. However, while template 33 is advantageous for low volume manufacturing, it should be realized by one skilled in the art that template 33 would be incorporated into bottom portion 32 in high volume manufacturing.

Generally, as described with reference to FIG. 1 regarding mold 10, mold 30 is closed and brought to appropriate processing conditions. The molding material is injected into cavity 36, represented by arrow 34, thus filling cavity 36. By filling cavity 36 with the molding compound, surfaces 37 and 38 are replicated by the molding compound. Also, as previously describe with reference to FIG. 1, molding compound 34 is cured, solidified, and subsequently removed from mold 30, thereby providing second cladding layer 40 as shown in FIG. 4. Further, while mold 10 and mold 30 are discussed separately hereinabove, it should be understood that mold 10 and mold 30 typically are made together as part of a whole larger mold (not shown). By making mold 10 and mold 30 together several advantages are realized, such as facilitating robotic removal and subsequent robotic processing of first cladding layer 20 and second cladding layer 40, injection of the molding compound can be the same, thus producing similar or equal refractive indexes in first cladding layer 20 and second cladding layer 40.

Figure 5:
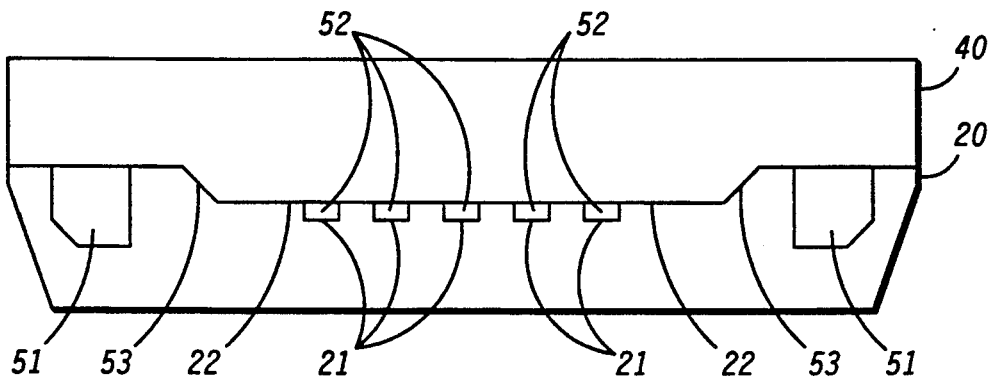
FIG. 5 is a simplified cross-sectional view of the molded first cladding layer and the molded second cladding layer affixed together.

FIG. 4 is a simplified cross-sectional view of molded second cladding layer 40 formed as with reference to FIG. 3. Typically, second cladding layer 40 is made in such a manner that surface 41 of second cladding layer 40 fits snugly against surface 22 of first cladding layer 20, as shown in FIG. 5. Additionally, a surface 42 may be modeled to suit specific applications, such as increasing surface area.

FIG. 5 is a simplified cross-sectional view of a molded waveguide 50. Molded waveguide 50 is made of first cladding layer 20, second cladding layer 40, and core material 52. It should be evident that first cladding layer 20 has been inverted so as to facilitate the viewing of molded waveguide 50.

Typically, molded first cladding layer 20 and molded second cladding layer 40 are joined by an optically transparent material which forms the core of the waveguide and acts as an adhesive or an optically transparent polymer. The optically transparent adhesive generally may be any of several materials, such as epoxies, plastics, polyimides, or the like. Generally, refractive indexes of these optically transparent materials range from 1.54 to 1.58. It should be understood that to form an optical waveguide the refractive index of core 52 must be at least 0.01 greater than that refractive index of cladding layers 20 and 40. However, in a preferred embodiment of the present invention, epoxies are used to join first cladding layer 20 to second cladding layer 40. Application of the adhesive is done in such a manner so as to completely fill channels 21 of first cladding layer 20, thereby forming core 52. Further, by having core 52 completely surrounded by cladding layers 20 and 40, core 52 has superior performance characteristics for conducting light or light signals. These superior performance characteristics are used in enhancing high speed communications applications, such as chip-to-chip communications, board-to-chip communications, board-to-board communications, computer-to-computer communications, and the like. Additionally, a capability is available, in the present invention, to match refractive indexes of cladding layers 20 and 40. However, while the adhesive completely fills channels 21 of first cladding layer 20, the adhesive is restricted from alignment ferrules 51 by slightly inclining a surface 53. Alignment ferrules 51, as shown in FIG. 5, are made by adhering first cladding layer 20 and second cladding layer 40 together; however, it should be evident to one skilled in the art that alignment ferrules 51 may be made by inverting openings 23 as shown in FIG. 2 into second cladding layer 40. It should be understood, however, that inverting openings 23 as shown in FIG. 2 into second cladding layer 40 can degrade alignment of alignment ferrules 51 to core 52. Typically, the adhesive is cured by a variety of methods, such as air drying, exposure to UV light, heat treating, or the like. Selection of specific curing methods is application specific as well as being dependent upon selection of adhesive and cladding materials that are used for making first and second cladding layers 20 and 40.

By way of example only, first cladding layer 20 and second cladding layer 40 are made by injecting a transparent epoxy molding compound, available under the Tradename HYSOL MG18 from Dexter Corporation, into molds 10 and 30, respectively. Temperature of molds 10 and 30 range between 150° C. to 175° C. with a preferred temperature range from 160 degrees Celsius to 165 degrees Celsius. Molding pressure of molds 10 and 30 range between 500 psi to 1,000 psi with a preferred pressure range from 750 pounds per square inch to 800 pounds per square inch. Typically, transfer time ranges from 30 to 50 seconds at a temperature of 150° C. to 20 to 30 seconds at a temperature of 175° C. Curing time typically ranges from 3 to 5 minutes at 150° C. to 2 to 4 minutes at a temperature of 175° C. Upon completion of the curing time, first cladding layer 20 and second cladding layer 40 are removed from molds 10 and 30, respectively. Typically, a post-curing step is necessary in order to achieve maximum physical and electrical properties of the HYSOL material. This step generally proceeds at 150 degrees Celsius for approximately 2 to 4 hours. Completion of the post-cure step results in first cladding layer 20 and second cladding layer 40 having a refractive index of approximately 1.52.

Once the molding and curing processes, as well as the removal of the first and second cladding layers 20 and 40 from their respective molds have been completed, the first and second cladding layers 20 and 40 are ready to be assembled. Assembly of the first and second cladding layers 20 and 40 is achieved by applying an optically clear adhesive with a refractive index at least 0.01 higher than the first and second cladding layers 20 and 40 to surface 22. In a preferred embodiment of the present invention, these requirements are fulfilled by applying an optically clear epoxy available under a Tradename EPO-TEK 301-2 from EPOXY TECHNOLOGY INC. Typically, after the adhesive is applied to surface 22 of the first cladding layer 20, surface 41 of second cladding layer 40 is compressed against surface 22 of first cladding layer 20, thereby squeezing and filling channels 21 and adhering both first cladding layer 20 and second cladding layer 40 together. Additionally, it should be understood that by adhering first cladding layer 20 and second cladding layer 40 together, alignment ferrules 51 are formed. Curing times for the adhesive epoxy is dependent upon temperature, e.g., at room temperature curing time is 2 days and at 80 degrees Celsius curing time is 1.5 hours.

FIG. 6 is a simplified partially exploded pictorial view of an optical electronic module 60. In the present invention molded optical waveguide 61 is electrically coupled to standard electronic components.

Typically, waveguide 61 is fitted with optical components, such as a phototransmitter or laser 62, a photodetector or photodiode 63, or a combination of both lasers and photodetectors. Alternatively, an array 64 can be mounted on waveguide 61 which contains a variety of optical components. The optical components are mounted to molded optical waveguide 61 in such a manner that individual working portions of the optical components are aligned to an individual waveguide, thus providing maximum light transmission through individual waveguides. For example, laser 62 is mounted to tab 67 and tab 68 by solder bump 69. By accurately placing and solder bumping laser 62 to molded optical waveguide 61, light transmission from the working portions of laser 62 through waveguide 71 is maximized.

Generally, molded optical waveguide 61 with attached optical components is attached to interconnect board 66. Several methods may be used for attaching interconnect board 66 to molded optical waveguide 61, such as adhering, press fitting, molding or the like. However, in a preferred embodiment of the present invention, an epoxy adhesive is applied to interconnect board at an approximate location where the molded optical waveguide 61 and the interconnect board 66 are to be bonded. Waveguide 61 is placed onto the adhesive by an automated system such as a robot arm, thereby providing accurate placement and orientation of waveguide 61.

Subsequent electrical coupling of standard electrical components, as illustrated by integrated circuit 74, on interconnect board 66 to the optical components is achieved by a wire bond 76 from bonding pad 77 to tab 67. It should be evident by one skilled in the art, that many more electrical couplings typically are necessary to fully utilize inputs and outputs of both the standard electrical components and the optical components. It should be further evident that standard output and input means, represented by lead 78, are used to couple other components as well.

Further, plastic encapsulation of interconnect board 66 and molded optical waveguide 61 typically is achieved by an over-molding process, represented by plastic pieces 79, which encapsulates interconnect board 66 and optical waveguide 61 while leaving alignment ferrules 81 open and clear of debris. Alignment ferrules 81 are then engaged by alignment pins 84 of optical fiber ribbon 85, thereby providing accurate and repeatable alignment of waveguides 71, 72, and 73 to optical fiber ribbon 85.

By now it should be appreciated that a novel method for making a molded optical waveguide and an optical electrical module have been described. The method allows for the making of waveguides cost effectively, thus allowing their usage in optical electrical modules. Additionally, this method allows for an inexpensive process for combining both standard electrical components and optical components.

We claim:

1. A method for manufacturing a molded waveguide comprising the steps of:
   providing a first cladding layer;
   forming channels in the first cladding layer;
   providing a second cladding layer;
   filling the channels with an optically transparent polymer;
   affixing the second cladding layer over the channels, thereby enclosing the channels; and
   forming alignment ferrules in the molded waveguide.

2. A method as set forth in claim 1 wherein the providing of the first cladding layer, the providing of the second cladding layer, and the optically transparent polymer have a first, a second, and a third refractive index respectively, wherein the first and second refractive indexes are lower than the third refractive index.

3. A method as set forth in claim 2 wherein the refractive index of the first cladding layer and the second cladding layer ranges between 1.50 to 1.54 and the refractive index of the optically transparent polymer ranges between 1.54 to 1.58.

4. A method as set forth in claim 3 wherein the first and second refractive indexes are 0.01 lower than the third refractive index.

5. A method as set forth in claim 1 wherein the affixing of the second cladding layer over the channels is achieved by compressing the first cladding layer and the second cladding layer together.

6. A method as set forth in claim 1 wherein the forming of channels is accomplished by further including the steps of:
   providing a mold;
   providing a template in the mold, wherein the template is a negative image of the channels; and
   injecting an optically transparent polymer into the mold forming the channels in the optically transparent polymer, thereby fabricating the first cladding layer.

7. A method as set forth in claim 6 wherein the providing of the template is accomplished by having the negative image of the channels as an integral part of the mold.

8. A method as set forth in claim 1 wherein the providing of a second cladding layer is accomplished by further including the steps of:
providing a mold;
providing a template in the mold, wherein the template is a negative image of the second cladding layer; and
injecting an optically transparent polymer into the mold, thereby fabricating the second cladding layer.

9. A method as set forth in claim 1 wherein the providing of the first cladding layer is accomplished by selecting an optically transparent material from one the following materials epoxies, plastics, or polyimides.

10. A method a set forth in claim 9 wherein the selecting of the first cladding layer material is accomplished by selecting an epoxy.

11. A method as set forth in claim 1 wherein the providing of the second cladding layer is accomplished by selecting an optically transparent material from one the following materials epoxies, plastics, or polyimides.

12. A method as set forth in claim 11 wherein the selecting of the second cladding layer material is accomplished by selecting an epoxy.

13. A molded waveguide comprising:
a first molded cladding layer having a plurality of channels;
a second molded cladding layer; and
an adhesive core material, wherein the adhesive core material fills the plurality of channels securing the first molded cladding layer and the second molded cladding layer together; and
alignment ferrules placed into the waveguide.

14. A molded waveguide as set forth in claim 13 wherein the alignment ferrules are molded into either the first cladding layer or the second cladding layer.

15. A molded waveguide as set forth in claim 13 wherein the alignment ferrules are parallel to the channels.

16. A molded waveguide as set forth in claim 13 wherein the first molded cladding layer, the second molded cladding layer and the adhesive core material have a first, a second, and a third refractive index, wherein the first and second refractive indexes are lower than the third refractive index.

17. A molded waveguide as set forth in claim 13 wherein the refractive index of the first molded cladding layer and the second molded cladding layer ranges between 1.50 to 1.54 and the refractive index of the adhesive core material ranges between 1.54 to 1.58.

18. A molded waveguide as set forth in claim 13 wherein the first and second refractive indexes are at least 0.01 lower than the third refractive index.

19. A molded waveguide as set forth in claim 13 wherein the plurality of channels have a minimum feature size of 0.5 microns.

20. A molded waveguide as set forth in claim 13 wherein the first cladding layer and the second cladding layer is selected from a group of optically transparent materials epoxies, plastics, or polyimides.

21. A method for making a molded split waveguide comprising the steps of:
molding a first cladding layer with a channel that is split at least once producing at least two channels;
molding a second cladding layer;
filling the channel and the at least two channels with an optically transparent polymer; and
affixing the second cladding layer over the first cladding layer enclosing the channels and the at least two channels; and
forming alignment ferrules in the molded waveguide.

22. A method for making a molded split waveguide as claimed in claim 21 wherein molding the first cladding layer, molding the second cladding layer, and the optically transparent polymer have a first, a second, and a third refractive indexes, respectively, wherein the first and the second refractive indexes are lower than the third refractive index.

23. A method for making a molded split waveguide as claimed in claim 22 wherein the refractive index of the first cladding layer and the second cladding layer ranges between 1.150 to 1.54 and refractive index of the optically transparent polymer ranges between 1.54 to 1.58.

24. A method for making a molded split waveguide as claimed in claim 23 wherein the first and the second refractive indexes are 0.01 lower that the third refractive index.

25. A molded split waveguide comprising:
a first cladding layer having a channel split into at least two channels and an alignment guide molded therein; and
a second cladding layer affixed to the first cladding layer with an optically transparent polymer, wherein the optically transparent polymer fills the channel and the at least two channels, thereby making a molded split waveguide.

26. A molded split waveguide as claimed in claim 25 wherein the optically transparent polymer is an epoxy.

27. A molded split waveguide as claimed in claim 25 wherein the first cladding layer, the second cladding layer, and the optically transparent polymer have a first, a second, and a third refractive indexes, respectively, wherein the first and the second refractive indexes are lower than the third refractive indexes.

28. A molded split waveguide as claimed in claim 25 further comprising:
an optical connector having an optical fiber ribbon cable joined thereto, the optical connector having an alignment guide that corresponds in location to the alignment guide of the molded split waveguide, such that connecting the alignment guide of the connector to the alignment guide of the molded split waveguide aligns the optical fiber ribbon cable to the molded split waveguide.

29. A molded split waveguide as claimed in claim 25 wherein the channel and the at least two channels have a minimum feature size of 0.5 micron.

30. A molded split waveguide as claimed in claim 25 wherein the first cladding layer and the second cladding layer is selected from a group of materials comprising epoxies, plastics, or polyimides.

* * * * *